2,934,557

α-ISOPROPYL-α-(β'-DIMETHYLAMINO PROPYL) PHENYL ACETONITRILE, AND A PROCESS OF MAKING SAME

Werner Stühmer, Eldagsen, near Hannover, and Siegfried Funke, Hannover-Waldheim, Germany, assignors to Kali-Chemie Aktiengesellschaft, Hannover, Germany, a corporation of Germany No Drawing. Application April 7, 1958
Serial No. 726,628

Claims priority, application Germany April 11, 1957

5 Claims. (Cl. 260—465)

The present invention relates to α-iso-propyl-α(β'-dimethylamino propyl) phenylacetonitrile and acid addition salts thereof, and to a process of producing the same.

It is one object of the present invention to provide α-isoproyl-α-(β'-dimethylamino propyl) phenyl acetonitrile and addition salts thereof with pharmacologically acceptable acids, which are highly effective as antitussive agents.

Another object of the present invention is to provide a simple and effective process of producing said α-isopropyl-α-(β'-dimethylamino propyl) phenyl acetonitrile and acid addition salts thereof.

Other objects of the present invention and advantageous features thereof will become apparent as the description proceeds.

α-Isopropyl-α-(β'-dimethylamino propyl) phenyl acetonitrile of the formula

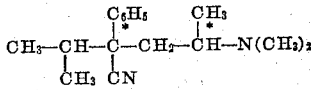

is prepared by reacting α-isopropyl phenyl acetonitrile with 2-dimethylamino-1-chloro propane in the presence of sodium amide or by reacting α-(β'-dimethylamino propyl) phenyl acetonitrile with an isopropyl halogenide in the presence of sodium amide. The resulting α-isopropyl-α-(β'-dimethylamino propyl) phenyl acetonitrile is purified and, if desired, converted into its acid addition salt.

This compound is characterized by the presence of two asymmetric carbon atoms in their carbon chain which asymmetric carbon atoms are separated from each other by a carbon atom. This position of the two asymmetric carbon atoms is apparently responsible for the surprisingly high and pronounced antitussive acitivity of the new compound.

The antitussive activity of α-isopropyl-α-(β'-dimethylamino propyl) phenyl acetonitrile was determined on guinea pigs in urethane narcosis. Coughing was induced by electrical irritation of the trachea by means of a blunt platinum electrode. The used device is known to the art as "Megatest" apparatus. Irritation was caused by rectangular current impulses of a frequency of 10 per second, each impulse having a duration of five thousandth of a second and an intensity of 5 ma. to 15 ma. The fits of coughing were registered mechanically by recording the movement of the abdominal walls. The tests were made only qualitatively. Only those of the animals were considered as giving a positive reaction to the new agent in which coughing was completely suppressed on electrical irritation of the trachea. The average effective dose (ED50) was determined by plotting a dose-effect diagram according to Litchfield and Wilcoxon.

The average effective dose of α-isopropyl-α-(β'-dimethylamino propyl) phenyl acetonitrile according to the present invention is 5.4 mg./kg. when administered intravenously. Compared with codeine phosphate which, on intravenous administration has an average effective dose of 7 mg./kg., the compound has a considerably higher antitussive activity.

This result is quite surprising since similar amino nitriles having two asymmetric carbon atoms in neighboring position to each other are completely ineffective as antitussive agents.

The results of the above mentioned pharmacological tests were confirmed by clinical tests.

The following examples serve to illustrate the present invention without, however, limiting the same thereto.

EXAMPLE 1

*Preparation of α-isopropyl-α-(β'-dimethylamino propyl) phenyl acetonitrile*

140 cc. of benzene and 24 g. of α-isopropyl phenyl acetonitrile are added to 7.5 g. of sodium amide. The mixture is stirred and refluxed for one hour. After cooling, 25 g. of 2-dimethylamino-1-chloro propane, dissolved in 20 cc. of benzene, are added and stirring and refluxing of the mixture is continued for 4 hours. After the reaction is completed, water is added to the reaction mixture. The benzene layer is separated from the aqueous layer and is extracted by means of 4 N hydrochloric acid. The acid solution is rendered alkaline. The separated oil is taken up in ether. After drying the ethereal solution over sodium sulfate and distilling off the ether, the resulting crude α-isopropyl-α-(β'-dimethylamino propyl) phenyl acetonitrile is purified by distilllation in a vacuum. The compound boils at 138–146° C./3 mm.

EXAMPLE 2

*Preparation of α-isopropyl-α-(β'-dimethylamino propyl) phenyl acetonitrile*

120 cc. of benzene and 16.3 g. of α-(β'-dimethylamino propyl) phenyl acetonitrile, boiling at 134–139° C./6 mm. and prepared by reacting 15 g. of benzyl cyanide and 17.5 g. of 2-dimethylamino-1-chloro propane in the presence of 6.5 g. of sodium amide, are added to 4 g. of sodium amide. After stirring and refluxing the mixture for one hour, 11 g. of isopropyl bromide dissolved in 10 cc. of benzene are added thereto and stirring and refluxing is continued for 4 hours. The reaction mixture is worked up as described hereinabove in Example 1. The resulting compound is identical with that obtained according to Example 1.

α-Isopropyl-α-(β'-dimethylamino propyl) phenyl acetonitrile forms a citurate which melts at 63–64° C., on recrystallization from a mixture of alcohol and ether (1:10). It is hygroscopic an dreadily soluble in water.

It also forms a tartrate having a melting point of 64° C. on recrystallization from ether. It is hygroscopic and readily soluble in water.

The citrate and the tartrate as well as other acid addition salts are prepared, for instance, by adding ethereal solutions of citric acid, tartaric acid, or suitable other acids to the solution of an equivalent amount of the base dissolved in ether. Thereby, the citrate, tartrate or other addition salts precipitate.

For preparing the salts with a volatile acid, such as hydrochloric acid, hydrobromic acid and the like, said acids are introduced in the gaseous state in equivalent amounts into the ethereal solution of the base whereby the acid addition salts are formed and are precipitated.

The citrate, tartrate, and the like salts can also be obtained, for instance, by mixing methanolic solutions of equivalent amounts of the base and the respective acid and evaporating the solvent by heating on the water bath in a vacuum.

In place of the acid addition salts with citric acid and tartaric acid, there may be prepared the salts with other pharmaceutically acceptable acids, inorganic as well as organic acids, such as hydrochloric acid, hydrobromic acid, nitric acid, sulfuric acid, succinic acid, malic acid, benzoic acid, nicotinic acid, and others.

The new antitussive agent is preferably administered in the form of a cough sirup, cough drops, suppositories, as injectable solution, or the like. The following examples serve to illustrate suitable and effective antitussive preparations containing the new compound or its acid addition salts without, however, limiting the present invention thereto.

EXAMPLE 3

Cough sirup

An effective cough sirup is composed as follows:

10 g. of the citrate of $\alpha$-isopropyl-$\alpha$-($\beta'$-dimethylamino propyl) phenyl acetonitrile,
800 g. of sugar,
0.6 g. of the methyl ester of p-hydroxy benzoic acid known to the trade as "Nipagin M," and
0.2 g. of the propyl ester of p-hydroxy benzoic acid known to the trade as "Nipasol M" are dissolved in 475 cc. of cherry juice, and the solution is made up to 1000 cc. by the addition of distilled water.

5 cc. of said cough sirup contain about 50 mg. of the new antitussive agent.

EXAMPLE 4

Cough drops 50 g. of the citrate of $\alpha$-isopropyl-$\alpha$-($\beta'$-dimethylamino propyl) phenyl acetonitrile,
0.6 g. of the methyl ester of p-hydroxy benzoic acid known to the trade as "Nipagin M," and
0.2 g. of the propyl ester of p-hydroxy benzoic acid known to the trade as "Nipasol M" are dissolved in distilled water, and the solution is made up to 1000 cc. by the addition of distilled water.

1 cc. of said cough drops contains about 50 mg. of the new antitussive agent.

As a minimum dose there are given three times daily 12 drops of said cough drop preparation. The preferred dose is three times daily 20 drops and the maximum dose is three times daily 40 drops.

EXAMPLE 5

Suppository 100 g. of the citrate of $\alpha$-isopropyl-$\alpha$-($\beta'$-dimethylamino propyl) phenyl acetonitrile are incorporated into 2000 g. of cocoa butter.

The intimate and uniform molten mixture is poured into suppository molds to yield 1000 suppositories. Each suppository contains 100 mg. of the new antitussive compound.

EXAMPLE 6

Injectable solution 110 g. of the citrate of $\alpha$-isopropyl-$\alpha$-($\beta'$-dimethylamino propyl) phenyl acetonitrile, are dissolved in 1100 cc. of saline solution.

The solution is filled up into 1000 ampoules, each containing 1.1 cc. with 110 mg. of the new antitussive compound.

The minimum single dose of the new antitussive agent to be administered is about 30 mg. and the maximum single dose about 100 mg. while the preferred single dose is about 50 mg. Such a dose is given two to four times and preferably three times daily with very satisfactory results.

We claim:

1. The $\alpha$-isopropyl-$\alpha$-($\beta'$-dimethylamino propyl) phenyl acetonitrile compound selected from the group consisting of $\alpha$-isopropyl-$\alpha$-($\beta'$-dimethylamino propyl) phenyl acetonitrile of the formula

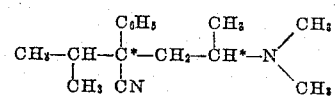

wherein * indicates the asymmetric carbon atoms in said base, and its non-toxic acid addition salts.

2. The $\alpha$-isopropyl-$\alpha$-($\beta'$-dimethylamino propyl) phenyl acetonitrile compound selected from the group consisting of $\alpha$-isopropyl-$\alpha$-($\beta'$-dimethylamino propyl) phenyl acetonitrile of the formula

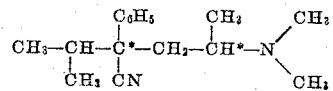

wherein * indicates the asymmetric carbon atoms in said base, and its non-toxic acid addition salts formed with an acid selected from the group consisting of citric, tartaric, hydrochloric, hydrobromic, nitric, sulfuric, succinic, malic, benzoic, and nicotinic acids.

3. $\alpha$-isopropyl-$\alpha$-($\beta'$-dimethylamino propyl) phenyl acetonitrile.

4. The citrate of $\alpha$-isopropyl-$\alpha$-($\beta'$-dimethylamino propyl) phenylacetonitrile.

5. The tartrate of $\alpha$-isopropyl-$\alpha$-($\beta'$-dimethyl amino propyl) phenyl acetonitrile.

References Cited in the file of this patent

Stühmer et al. (Germany), May 24, 1956, "Patentanmeldung" K21648, 3 pages.
Stühmer at al. (Germany), June 14, 1956, "Patentanmeldung" K21810, 3 pages.